United States Patent
Mayer et al.

(10) Patent No.: US 11,414,192 B2
(45) Date of Patent: Aug. 16, 2022

(54) PASSENGER CABIN FOR A VEHICLE, AND A VEHICLE HAVING AT LEAST ONE SUCH CABIN

(71) Applicant: Airbus Operations GmbH, Hamburg (DE)

(72) Inventors: Tobias-Valentin Mayer, Hamburg (DE); Viljami Räisänen, Helsinki (FI); Martin Engberg, Hillerød (DK); Koji Yamaguchi, Aichi (JP)

(73) Assignee: Airbus Operations GmbH

( * ) Notice: Subject to any disclaimer, the term of this patent is extended or adjusted under 35 U.S.C. 154(b) by 177 days.

(21) Appl. No.: 16/750,385

(22) Filed: Jan. 23, 2020

(65) Prior Publication Data
US 2020/0247542 A1 Aug. 6, 2020

(30) Foreign Application Priority Data
Jan. 31, 2019 (DE) .................... 10 2019 102 483.8

(51) Int. Cl.
*B64D 11/00* (2006.01)
*B64D 11/06* (2006.01)
(Continued)

(52) U.S. Cl.
CPC ............... *B64D 11/00* (2013.01); *B64C 1/00* (2013.01); *B64C 1/18* (2013.01); *B64C 1/22* (2013.01);
(Continued)

(58) Field of Classification Search
CPC ..... B64D 11/00; B64D 11/06; B64D 11/0601; B64D 2011/0046; B64C 1/00; B64C 1/22; B64C 2001/0018; B64C 2001/0027
See application file for complete search history.

(56) References Cited

U.S. PATENT DOCUMENTS

| | | |
|---|---|---|
| 504,615 A | 9/1893 | Pope |
| 3,337,164 A | 8/1967 | Clifford |
| (Continued) | | |

FOREIGN PATENT DOCUMENTS

| | | |
|---|---|---|
| DE | 3501887 A1 | 7/1986 |
| DE | 102012005148 A1 | 9/2013 |
| (Continued) | | |

OTHER PUBLICATIONS

German Search Report with opinion for Application No. 102019102483.8 dated Jan. 16, 2020, 6 pages (p. 2 categorizing cited references).

*Primary Examiner* — Benjamin P Lee
(74) *Attorney, Agent, or Firm* — Lerner, David, Littenberg, Krumholz & Mentlik, LLP

(57) ABSTRACT

A vehicle passenger cabin has a holding structure having multiple load introduction points, a multiplicity of support structure parts to be attached to the load introduction points, a lower base for delimiting a lower passenger deck, and a multiplicity of furnishing components to be fastened to the support structure parts. The holding structure has laterally on both sides one floor overhang as a lower delimitation of an upper passenger deck, extending from a laterally outer region of the holding structure radially inwards and at a distance vertically from the lower base. The structure parts are at least regionally curved or bent and are connected at an upper end and at a lower end to an upper and a lower load introduction points, respectively. The structure parts have a first receiving surface for receiving one of the furnishing components, which first receiving surface adjoins the floor overhang radially on the inside.

15 Claims, 4 Drawing Sheets

(51) Int. Cl.
  *B64C 1/18* (2006.01)
  *B64C 1/22* (2006.01)
  *B64C 1/00* (2006.01)

(52) U.S. Cl.
  CPC ...... *B64D 11/06* (2013.01); *B64C 2001/0027* (2013.01)

(56) References Cited

U.S. PATENT DOCUMENTS

| | | | |
|---|---|---|---|
| 3,784,989 A * | 1/1974 | LeGrand | A47C 19/20 5/9.1 |
| 4,066,227 A * | 1/1978 | Buchsel | B64D 11/00 105/340 |
| 5,086,996 A | 2/1992 | Roeder et al. | |
| 5,716,026 A * | 2/1998 | Pascasio | B64D 11/00 105/315 |
| 7,448,575 B2 * | 11/2008 | Cheung | B64D 11/00 244/118.6 |
| 9,278,757 B2 * | 3/2016 | Dupont | B64D 11/00 |
| 9,308,995 B2 * | 4/2016 | Spellman | B64D 11/00 |
| 9,994,127 B2 * | 6/2018 | Cheung | B60N 2/0292 |
| 10,793,247 B2 * | 10/2020 | Fan | H05K 7/20709 |
| 2006/0192050 A1 * | 8/2006 | Cheung | B60N 2/06 244/118.6 |
| 2009/0065642 A1 * | 3/2009 | Cheung | B60N 2/22 244/118.6 |
| 2010/0065684 A1 | 3/2010 | Ruiter et al. | |
| 2010/0187352 A1 | 7/2010 | Yavilevich | |
| 2013/0119203 A1 * | 5/2013 | Dupont | B64C 1/18 244/137.2 |
| 2014/0110981 A1 | 4/2014 | Hasegawa et al. | |
| 2015/0069181 A1 | 3/2015 | Wuggetzer et al. | |
| 2015/0274298 A1 * | 10/2015 | Kircher | B64D 11/0604 244/118.6 |
| 2017/0233057 A1 | 8/2017 | Charles et al. | |
| 2020/0247545 A1 * | 8/2020 | Vollers | B64C 1/18 |

FOREIGN PATENT DOCUMENTS

| | | | |
|---|---|---|---|
| DE | 102012020846 A1 | 4/2014 | |
| DE | 102019102476 A1 * | 8/2020 | ............... B64C 1/00 |
| GB | 531357 A | 1/1941 | |
| WO | 2013135670 A1 | 9/2013 | |

* cited by examiner

PASSENGER CABIN FOR A VEHICLE, AND A VEHICLE HAVING AT LEAST ONE SUCH CABIN

FIELD OF THE INVENTION

The invention relates to a passenger cabin for a vehicle, and to a vehicle having at least one such cabin.

BACKGROUND OF THE INVENTION

A passenger cabin of a vehicle may be of single-level or multi-level design. In practically all the known types of vehicle for passenger transport, multi-level passenger cabins are also known. One aim in the design of a vehicle for passenger transport is usability which is as economical as possible and for which there is the most optimum possible cost-benefit ratio. This can be achieved in that the largest possible number of passenger seats is able to be realized, there being at the same time dimensions of the passenger cabin or of the vehicle which are as compact as possible. Further constraints are significant according to the type of vehicle.

For example, in the case of passenger transport aircraft, the lowest possible weight should be taken into consideration. Furthermore, for realizing the lowest possible air resistance, a flowed-around surface which is as small as possible should be realized. In the case of passenger transport aircraft having a circular fuselage cross section, this could have an effect particularly on minimization of the (central) fuselage diameter.

DE 10 2012 005 148 A1 discloses for example a passenger cabin for vehicles in which there are two passenger decks which are arranged one above the other and which have an arrangement of seats and aisles that is not mirror-symmetrical. The floors of the passenger decks situated one above the other are bent multiple times and have different individual seats and seat benches.

BRIEF SUMMARY OF THE INVENTION

An aspect of the invention relates to an alternative passenger cabin for a vehicle, which alternative passenger cabin has dimensions as compact as possible and leads to the most advantageous use of the structural space present.

What is proposed is a passenger cabin for a vehicle, having a holding structure which has multiple load introduction points, a multiplicity of support structure parts able to be attached to the load introduction points, a lower base for delimiting a lower passenger deck, and a multiplicity of furnishing components able to be fastened to the support structure parts, wherein the holding structure has laterally on both sides in each case one floor overhang as a lower delimitation of an upper passenger deck, which floor overhang extends from a laterally outer region of the holding structure radially inwards and is at a distance vertically from the lower base, wherein the support structure parts are at least regionally curved or bent and are connected at an upper end to an upper load introduction point and at a lower end to a lower load introduction point, and wherein the support structure parts each have a first receiving surface for receiving one of the furnishing components, which first receiving surface adjoins the floor overhang radially on the inside.

The passenger cabin according to an embodiment of the invention accordingly requires a holding structure which serves as a basis for the proposed construction. The holding structure may preferably extend over an entire circumferential surface of a fuselage of the vehicle. It may for example have or form a rib and/or at least one longitudinal stiffening element of the fuselage. Here, the holding structure could be connected to a primary structure of the vehicle, or could form a part thereof.

The load introduction points are to be considered as defined mechanical connection points to which the support structure parts are able to be fastened. It is preferable for provision to be made of multiple upper load introduction points which extend along the longitudinal direction of the holding structure at a distance from one another. Preferably, the load introduction points are arranged in a grid pattern.

For connecting the support structure parts to the load introduction points, any types of connection means are conceivable, and so the holding structure could have for example multiple flanges, receiving bores or similar means, which are suitable for receiving corresponding connection means. Provision is made at least of upper and lower load introduction points, which are in each case intended for a single connection or a group of connections. Further load introduction points may be provided between the upper load introduction point and the lower load introduction point.

For the realization of a delimitation of a lower passenger deck, provision is made of a lower base which could be arranged on a lower, radially inner end of the holding structure. For the formation of a lower delimitation of an upper passenger deck, the holding structure has the two floor overhangs, which extend for example from a radially inner, laterally outer delimitation of the holding structure radially inwards at half the height of the holding structure.

The floor overhangs are oriented so as to be substantially horizontal and are arranged on opposing sides of the holding structure. As a result of their in each case radially inwardly directed extent, the two floor overhangs approach one another, there remaining however at least one horizontal gap between the two floor overhangs.

The support structure parts are formed such that they are connectable at least to the upper load introduction point and the lower load introduction point. They are bent or angled multiple times and, in this case, follow, at least regionally, a radially inner, laterally outer delimitation of the holding structure. The support structure parts have at least one first receiving surface, onto which furnishing components may be placed. Said furnishing components may be in particular passenger seats, but also monuments, stowage compartments or other furnishing components, which are able to be used in a vehicle for furnishing the passenger cabin. The support structure parts have an inherent stability. They are preferably dimensioned such that, for all the load situations of the vehicle to be assumed, they are able to hold in the intended position all the furnishing components fastened thereto and are reliably able to introduce all the generated loads into the holding structure via the fastened load introduction points. The support structure parts would be able to transmit the load into the holding structure via the upper and lower load introduction points. For additional stabilization of the support structure elements along the longitudinal direction of the aircraft, at least one point situated therebetween can be connected to a load introduction point.

By using the stated support structure parts, a complex floor construction and cabin furnishings fastened thereon are not necessary. Rather, a multiplicity of support structure parts can, along the longitudinal direction of the cabin, be inserted into the latter in order for the desired furnishing components to be arranged directly thereon. It is also conceivable that the support structure parts are already fully assembled outside the vehicle in order to then merely be installed into the vehicle. The time during which the furnishings are assembled in the vehicle itself can thus be reduced, with the result that the final assembly of the vehicle is sped up. Moreover, the furnishings of the passenger cabin are exchangeable in a highly flexible manner, and as desired, in that other support structure parts and/or other furnishing components are able to be fastened thereto.

In one advantageous embodiment, the support structure parts, at least sectionally, are lined up along a longitudinal axis of the passenger cabin. As stated previously, the support structure parts may accordingly be lined up such that a passenger cabin is formed over the respective length of the lining-up. Consequently, the support structure parts are installed only where a furnishing component has to be arranged. It is furthermore possible for the support structure parts to be designed such that they exhibit sufficient mechanical strength, which is adapted to the respective furnishing components. It might be sufficient to furnish at least sections along a longitudinal axis of the passenger cabin with said support structure parts in order to provide in other sections a conventional design of a passenger cabin, if this is necessary for mechanical reasons, for example lack of structural space.

In a further advantageous embodiment, the floor overhangs are dimensioned such that they have a lateral width extent which falls below a lateral width extent of a respective cabin half. In this way, a gap is provided for allowing the support structure parts to extend from an upper load introduction point to a lower load introduction point. Skillful shaping of the support structure parts also makes it possible to achieve in the region of the gap between two floor overhangs a larger clear height with respect to the lower base than in adjacent positions, with the result that, even in the case of relatively small fuselage diameters, an adequate standing height for passengers is achieved there. The head of a standing passenger would then extend into a region which is situated between the floor overhangs.

Preferably, the support structure parts, in a running direction, from one end to the other end, have a width which corresponds at most to one tenth of the length along the running direction. The support structure parts are therefore slender and can thus have a relatively low weight. The support structure parts may be formed from a metallic material or a fibre-reinforced plastic. In the running direction, they may have a profile cross section which is constant or, in accordance with requirement, varies locally. It might be worthwhile for provision to be made for a larger width at a lower end and/or at an upper end than in regions situated therebetween so as to be able to provide a certain flexural strength. During accelerations of the vehicle along the longitudinal direction of the cabin, the position and shape of the support structure parts can be maintained and the inertia forces are absorbed by way of the corresponding formation of the profile cross section of the support structure parts.

In a further preferred embodiment, the support structure parts each have a second receiving surface for receiving one of the furnishing components, wherein the second receiving surface adjoins the lower base. The lower passenger deck may consequently be formed by furnishing the second receiving surface.

Preferably, the second receiving surface bears snugly, in a flush manner, against a lateral inner surface of the holding structure between one of the floor overhangs and the lower base. Due to snug bearing against the lateral inner surface, the furnishing components are consequently arranged on mutually opposing lateral sides of the passenger cabin. If the furnishing components are designed as passenger seats, an aisle is situated centrally therebetween.

Likewise preferably, the support structure parts have an S-curve shape. Due to the S-curve shape, the support structure parts may, in the upper passenger deck, be situated in a central region, while in the lower passenger deck, they are arranged on the laterally outer region. The second receiving surface may then be arranged in particular below the floor overhangs.

In one advantageous embodiment, at least two support structure parts which follow one another along the longitudinal axis are arranged in a manner mirror-symmetrical with respect to one another. In this way, in the case of passenger seats being used as furnishing components, it is possible to realize different seating directions between successive support structure components and uniform transmission of force between the load introduction points.

For the provision of passenger seats, at least one upper arrangement with passenger seats may be arranged on at least one first receiving surface. It is conceivable for provision to be made of multiple different upper arrangements of passenger seats, for which merely single or multiple passenger seats are arranged on the first receiving surface.

It is advantageous if, on the laterally outer sides of the lower passenger deck, there is arranged in each case at least one lower arrangement with passenger seats. The laterally outer arrangement of passenger seats leads to an optimal use of the passenger cabin, since the passenger seats are arranged in regions of small clear height, while a lower aisle is able to be arranged in the central region with the largest clear height.

It is worthwhile for the at least one lower arrangement with passenger seats to be arranged on the at least one second receiving surface.

As mentioned previously, for optimal use of space of the lower passenger deck, it is expedient for a lower aisle to be arranged in the centre of the lower base.

As likewise mentioned previously, the floor overhangs each form a lateral aisle for the upper passenger deck. The passenger seats are then preferably arranged centrally in the upper passenger deck and able to be reached via the laterally outer, adjacent aisles. The arrangement of the passenger seats in the central region makes it possible to realize a larger clear height in the central region in the lower passage deck.

The invention also relates to an aircraft having an aircraft fuselage which has a passenger cabin according to the previous description arranged therein, wherein the passenger cabin is arranged in at least one axial section.

Preferably, in at least one axial section, a passenger cabin, with a single passenger deck and a cargo hold arranged therebelow, is formed, wherein the passenger deck has a floor which is arranged so as to be lower than the floor overhangs. It is thus possible to taken into account the fact that, in some regions of the aircraft fuselage, there is not sufficient structural space for two passenger decks, for example in the region of a wing box.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference signs are used for identical or similar objects.

DETAILED DESCRIPTION

Figure 1:
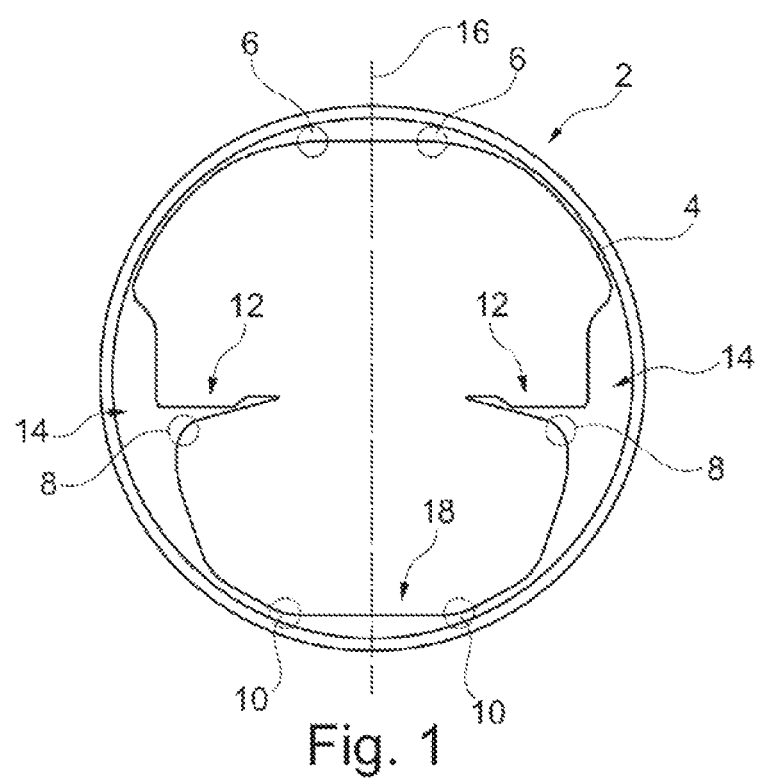
FIG. 1 shows, in a sectional illustration, an aircraft fuselage with a holding structure.

FIG. 1 shows an aircraft fuselage 2 with a holding structure 4 which is integrated therein and which is part of a fuselage structure, forms this or is designed separately therefrom. The holding structure 4 has multiple load introduction points 6, 8 and 10. These are indicated merely schematically and can, according to embodiment, be associated with particular fastening means, such as flanges or fastening bores.

The holding structure 4 moreover has laterally on both sides a floor overhang 12, which extends from a laterally outer region 14 of the holding structure 4 radially inwards. Here, the floor overhangs 12 extend not over an entire fuselage half, but rather end well before a vertical central plane 16, with the result that a gap is formed between the two floor overhangs 12.

A lower base 18 is furthermore indicated in the holding structure 4 and is arranged with a vertical spacing to the floor overhangs 12. Overall, the space present in the fuselage 2 is subdivided vertically into two sections, situated one above the other, as a consequence.

Figure 2:
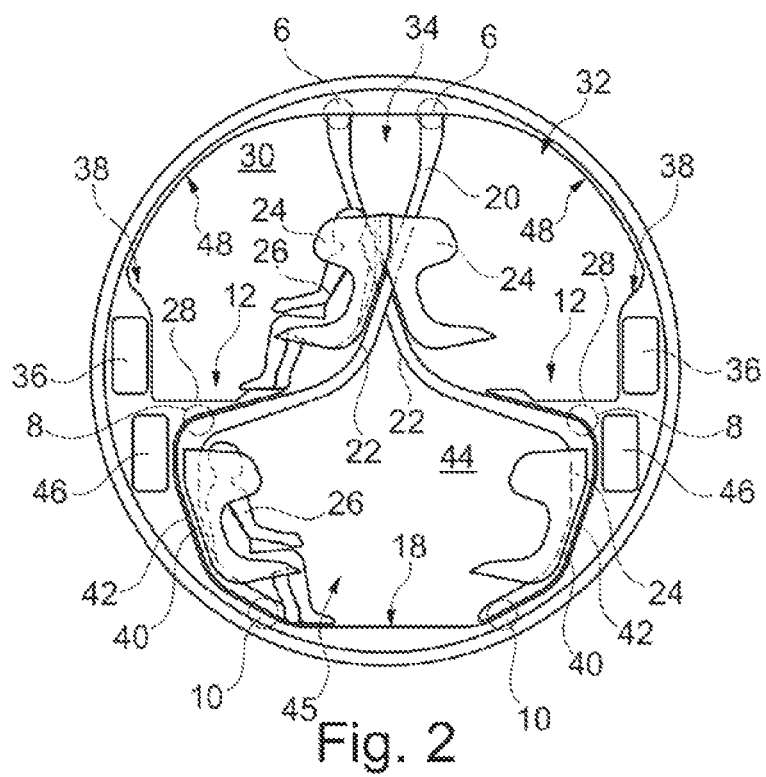
FIGS. 2 and 3 show, in a sectional illustration, a passenger cabin in the aircraft fuselage.

As shown in FIG. 2, it is possible for multiple support structure parts 20 to be inserted into the holding structure 4. Said support structure parts are designed as slender or elongate bodies which are bent or angled multiple times and which thus, by way of example, have an S-curve shape. For adaptation to other holding structures 4, said shape can be adapted regionally and in particular at the ends. The shape of the support structure parts 20 is formed such that each support structure part 20 is able to be fastened to holding points 6, 8 and 10 such that the arrangement shown in FIG. 2 is realized.

The support structure parts 20 are, by way of example, arranged in succession along a longitudinal direction of the fuselage 2 and, here, are in each case oriented in a mirror-symmetrical manner Each support structure part 20 is connected to an upper holding point 6 of the in each case other fuselage side. Consequently, in each case two support structure parts 20 which are arranged in a mirror-symmetrical manner cross one another. The support structure parts 20 each have a first receiving surface 22, onto which a furnishing component is able to be brought in each case. In the case shown, the furnishing components are embodied as passenger seats 24.

The first receiving surface 22 adjoins the respective floor overhang 12, with the result that a passenger 26, using an aisle 28 on the respective floor overhang 12, can reach a passenger seat 24, in order to sit down there. Consequently an upper passenger deck 30 of a passenger cabin 32 is thereby created. The upper passenger deck 30 consequently has an upper arrangement 34 of passenger seats 24 and has two radially outer aisles 28. Arranged on a radially outer side, that is to say at a distance from the passenger seats 24, are stowage compartments 36, which are accessible from the aisle 28. The stowage compartments 36 could have a flap 38 on their top side, by which flap the stowage compartment 36 is accessible.

The passenger seats 24 each have a seating direction which extends obliquely with respect to the longitudinal axis of the cabin 32. The seating directions, which substantially coincide with the viewing direction of a passenger 26 sitting straight, each include an angle with the longitudinal axis of the fuselage 2. Said angle may, by way of example, lie between 5 and 45°. Due to the arrangement of the support structure parts 20, which arrangement is mirror-symmetrical in an alternating manner, the passengers 26 consequently look obliquely towards front right and obliquely towards front left in an alternating manner Due to this staggered arrangement of passenger seats 24, the space in the upper passenger deck 30 can be advantageously used and allow adequate freedom of movement of the passengers 26.

Owing to the S-curve shape, the support structure parts 20 each have a second receiving surface 40, which may likewise be provided with a furnishing component. Here too, said furnishing components are, by way of example, passenger seats 24. The second receiving surfaces 40 bear snugly, in a flush manner, against a lateral inner surface 42 of the holding structure 4 between one of the floor overhangs 12 and the lower base 18. The available space is consequently used highly effectively. In this way, a lower passenger deck 44 is obtained. There, a lower arrangement 45 with passenger seats 24 is provided. Here too, the passenger seats 24 are provided in an alternating manner with different seating directions, which may correspond to the seating directions of the passenger seats 24 of the upper passenger deck 30.

Arranged laterally on the outside and directly below the floor overhangs 12 are stowage compartments 46, which are each able to be used by passengers 26 of the lower passenger deck 44.

The use of the support structure parts 20 shown allows an aircraft fuselage 2 to be furnished with a passenger cabin 32 in a mechanically very simple manner After the production of the holding structure 4, the elongate support structure parts 20 are introduced into the fuselage 2 and, there, fastened to the corresponding load introduction points 6, 8 and 10. At this juncture, it is pointed out that it is not absolutely necessary for all the load introduction points also to be realized or used. In particular, it would be possible not to include the load introduction points 8 if the support structure parts 20, at the their lower region, that is to say in the vicinity of the load introduction points 10, or at their upper region, that is to say in the region of the upper load introduction points 6, have such a width in the cabin longitudinal direction that their position can be reliably held by absorption of inertia forces along the longitudinal axis. Then, the central load introduction points 8 would be superfluous, and it would be conceivable to realize merely a type of sealing with respect to the respective floor overhang 12.

For the purpose of providing a high degree of passenger comfort, it is moreover conceivable, on inner sides 48 of the upper passenger decks 30, to provide one or more screens, for example to arrange OLED screens on which an outside view or an abstract movement design is reproduced.

Figures 3, 4:
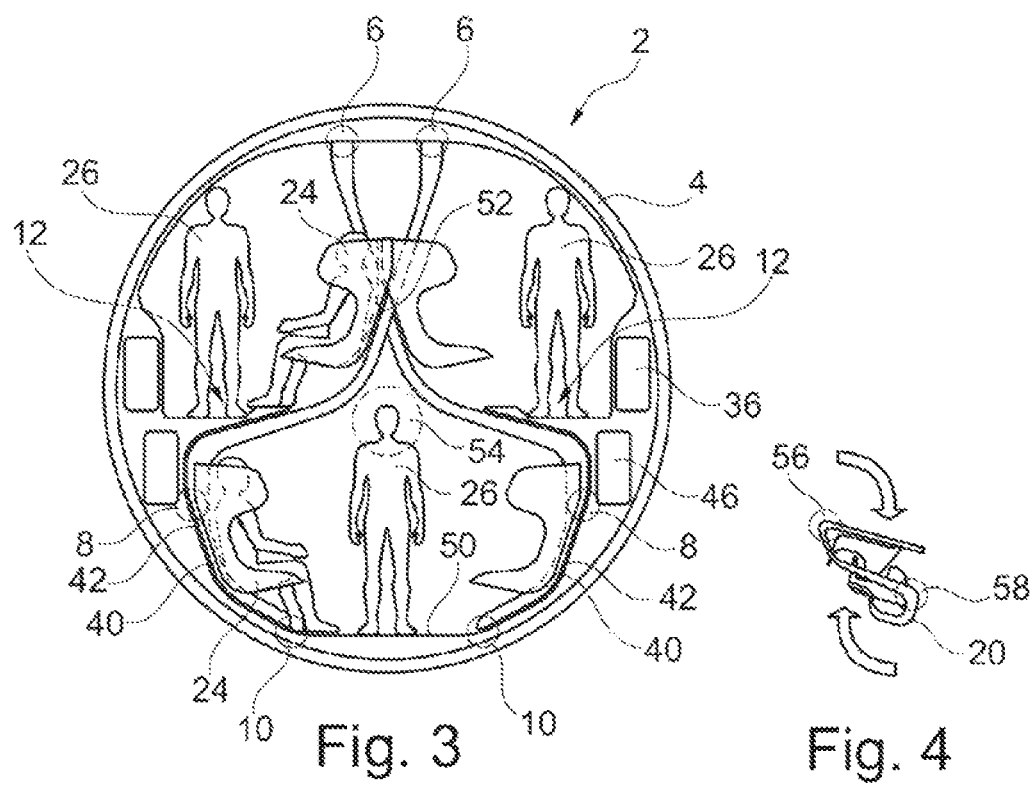
FIG. 4 shows a foldable design of a support structure part.

As can be seen in FIG. 3, it is possible, even using a fuselage diameter which lies between the fuselage diameter of a conventional short-haul aircraft having a cabin with a central aisle and the fuselage diameter of a long-haul aircraft having a cabin with a double aisle arrangement, and which is for example not greater than 4.5 m or 4.6 m, for highly effective use of the available space by passengers 26 to be achieved without limitations. The lower base 18 has, in relation to regions of the support structure parts 20 situated above, a clear height which is comfortably suitable for accommodating a standing passenger 26. The two radially outer aisles 28 likewise permit a standing height in the upper passenger deck 30. Since the upper arrangement 34 of passenger seats 24 is situated above the lower base 18, which forms a lower aisle 50, the shape of the support structure parts 20 may be formed such that they cross along a line situated behind the passenger seats 24 of the upper arrangement 34 and, from a crossing point 52 downwards, that is to say in the direction of the lower aisle 50, widen radially outwards. In this way, a head space 54 is obtained for the lower passenger deck 44, which head space, to a large extent, extends vertically above the height of the floor overhangs 12. Due to the skillful arrangement of the stowage compartments 36 and 46, it is also possible for each passenger 26 to be provided with adequate stowage space, which, moreover, is very simple to reach.

For exchanging or for replacing support structure parts 20, it is conceivable for these, as indicated in FIG. 4, to be designed to be compactible. For this purpose, it would be possible for example for use to be made of joints 56 and 58 which are arranged on the support structure parts 20 and which make it possible for the support structure parts 20 to be folded. In this way, retrofits, modifications or repairs can also be realized. Furthermore, it would also be possible for example for classes of seating to be changed at a later stage.

Figure 5:
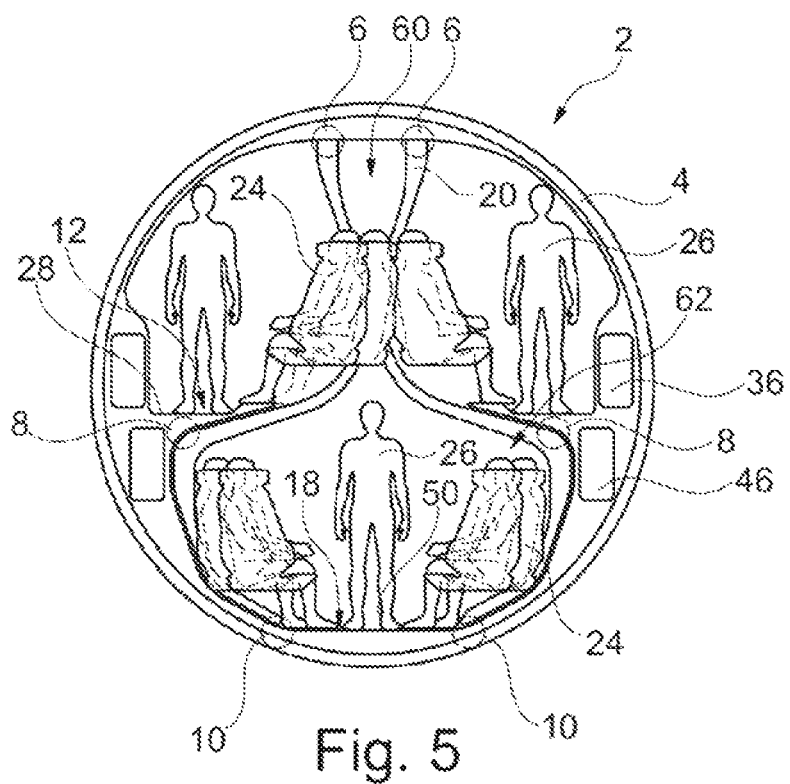
FIG. 5 shows, in a sectional illustration, a further passenger cabin in the aircraft fuselage.

As illustrated in FIG. 5, use could be made of upper arrangements 60 of passenger seats 24 for which multiple passenger seats 24 are arranged directly adjacent to one another on in each case single support structure part 20. This results in provision of a class of seating with somewhat less space. Analogously, this is conceivable for lower arrangements 62 of passenger seats 24.

Figure 6:
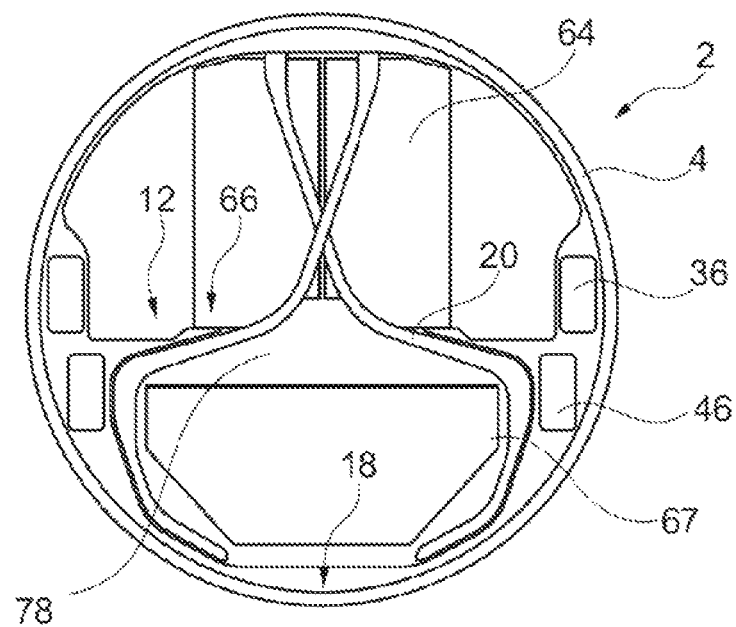
FIG. 6 shows, in a sectional illustration, a section of a passenger cabin with monuments which are arranged on support structure parts.

FIG. 6 shows a further embodiment. In addition to passenger seats 24, use may also be made of entirely different furnishing components, such as for example monuments 64, which are fastened onto the support structure parts 20. The monuments 64 may be integrated monuments which are arranged exclusively on the support structure parts 20 and which provide different functions. For example, a monument 64 could be a galley monument.

By way of example, a lower surface 66 bears on a floor overhang 12. As an alternative, instead of support, it is also possible for merely sealing with respect to the respective floor overhang 12 to be realized. It could be expedient for the monuments 64 to stand exclusively on the associated support structure part 20 or on a combination of multiple support structure parts 20.

As also illustrated in FIG. 6, the support structure parts 20 may be designed as a cargo hold 78 such that they would additionally also be able to accommodate standardized (air) cargo containers 67. The dimensions in a lower region of the support structure parts 20 are consequently adapted to cargo containers 67. Said cargo containers should preferably not stand on the lower base 18, it being possible here for provision to be made of receiving or support surfaces (not shown) which permit secure holding of the cargo containers 67.

Figure 7:
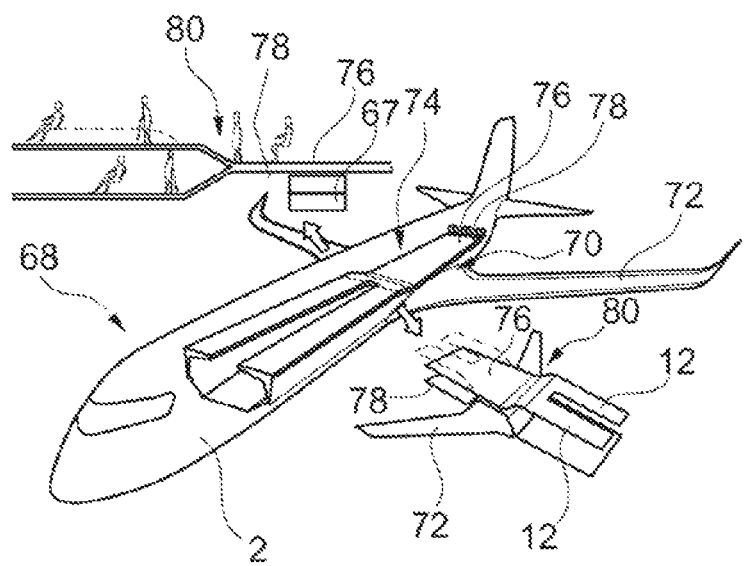
FIG. 7 shows an aircraft in which a passenger cabin according to an embodiment of the invention is arranged.

Since particular mechanical functions can be provided in an aircraft 68 shown in FIG. 7 that result in part of a fuselage cross section being taken up, the shown arrangement of support structure parts 20, by way of example, can extend merely over part of the length of the aircraft 68. By way of example, a wing box 70 is shown, on which wing box wings 72 are connected to the fuselage 2, wherein the wing box extends over a significant vertical region of the fuselage 2. It is conceivable for provision to be made in this region of an alternative cabin 74 with a single passenger deck 76. Said passenger deck extends in the vertical direction to below the floor overhangs 12. Adjoining this, a conventional cargo hold 78 could continue to be provided. Between the passenger cabin 32 and the alternative passenger cabin 74, provision may be made of a transition 80 via which, for example, it is possible to switch between the passenger decks 30 and 44 and also the alternative cabin 74.

Figure 8:
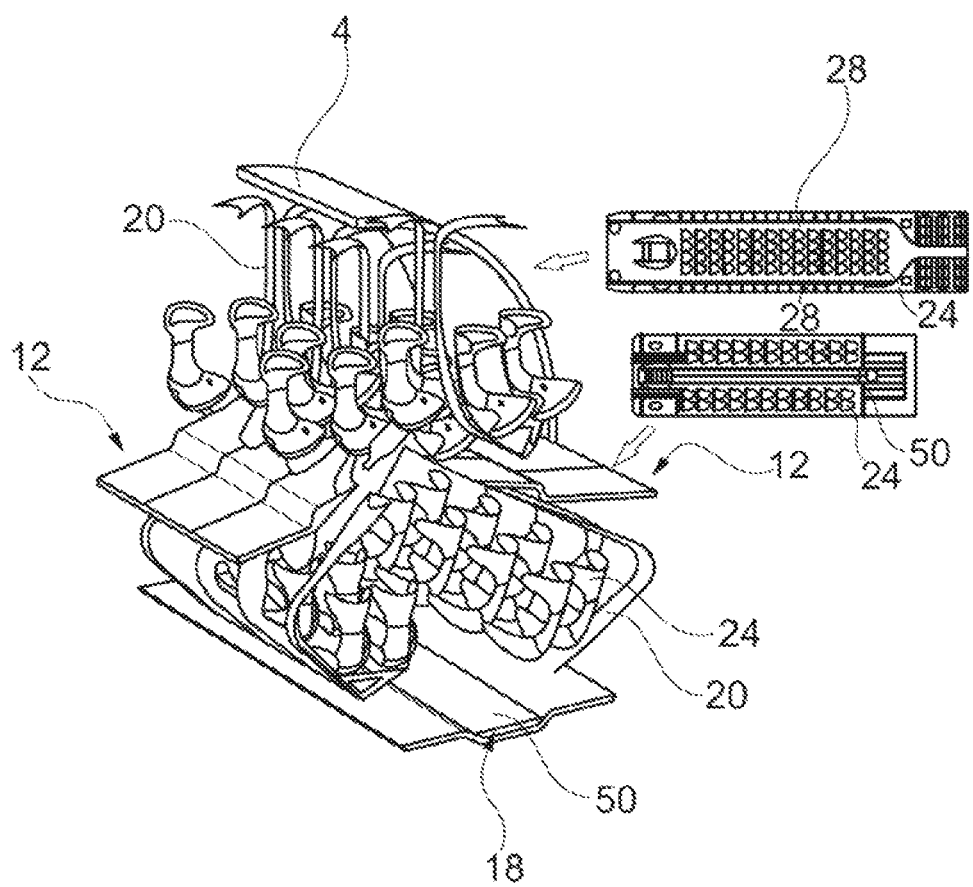
FIG. 8 shows a three-dimensional illustration of a cabin in an aircraft.

FIG. 8 shows by way of example a three-dimensional illustration of a detail of the cabin 32, wherein here, two passenger seats 24 are always arranged on one support structure part 20.

It is additionally pointed out that "having" or "comprising" does not rule out other elements or steps, and "a" or "an" does not rule out a multiplicity. It is also pointed out that features that have been described with reference to one of the above exemplary embodiments may also be used in combination with other features of other exemplary embodiments described above. Reference signs in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 Aircraft fuselage
4 Holding structure
6 Load introduction point
8 Load introduction point
10 Load introduction point
12 Floor overhang
14 Laterally outer region
16 Vertical central plane
18 Lower base
20 Support structure part
22 First receiving surface
24 Passenger seat
26 Passenger
28 Aisle
30 Upper passenger deck
32 Passenger cabin
34 Upper arrangement
36 Stowage compartment
38 Flap 40 Second receiving surface
42 Lateral inner surface
44 Lower passenger deck
45 Lower arrangement
46 Stowage compartment
48 Inner side
50 Lower aisle
52 Crossing point
54 Head space
56 Joint
58 Joint
60 Upper arrangement
62 Lower arrangement
64 Monument
66 Lower surface
67 Cargo container
68 Aircraft
70 Wing box
72 Wing
74 Alternative cabin
76 Passenger deck
78 Cargo hold
80 Transition

The invention claimed is:

1. A passenger cabin for a vehicle, comprising:
a holding structure having multiple load introduction points including an upper load introduction point and a lower load introduction point;
a multiplicity of support structure parts configured to be attached to the load introduction points;
a lower base for delimiting a lower passenger deck; and
a multiplicity of furnishing components configured to be fastened to the support structure parts,
wherein the holding structure has laterally on both sides in each case one floor overhang as a lower delimitation of an upper passenger deck, each of the floor overhangs extending from a laterally outer region of the holding structure radially inwards forming a gap therebetween and at a distance vertically from the lower base,
wherein the multiplicity of support structure parts are at least regionally curved or bent, are connected at an upper end to the upper load introduction point and at a lower end to the lower load introduction point, and extend through the gap, and
wherein the multiplicity of support structure parts each have a first receiving surface for receiving one of the multiplicity of furnishing components, the first receiving surface adjoining the floor overhang radially on the inside.

2. The passenger cabin according to claim 1, wherein the multiplicity of support structure parts, at least sectionally, are lined up along a longitudinal axis of the passenger cabin.

3. The passenger cabin according to claim 1, wherein the floor overhangs are dimensioned to have a lateral width extent falling below a lateral width extent of a respective cabin half, thereby forming the gap.

4. The passenger cabin according to claim 1, wherein the multiplicity of support structure parts, in a running direction, from one end to the other end, have a width corresponding at most to one tenth of the length along the running direction.

5. The passenger cabin according to claim 1,
wherein the multiplicity of support structure parts each have a second receiving surface for receiving one of the furnishing components, and
wherein the second receiving surface adjoins the lower base.

6. The passenger cabin according to claim 5, wherein the second receiving surface bears snugly, in a flush manner, against a lateral inner surface of the holding structure between one of the floor overhangs and the lower base.

7. The passenger cabin according to claim 1, wherein the multiplicity of support structure parts have an S-curve shape.

8. The passenger cabin according to claim 2,
wherein the multiplicity of support structure parts each have a second receiving surface for receiving one of the furnishing components,
wherein the second receiving surface adjoins the lower base, and
wherein at least two of the multiplicity of support structure parts which follow one another along the longitudinal axis are arranged in a manner mirror-symmetrical with respect to one another.

9. The passenger cabin according to claim 1, wherein at least one upper arrangement with passenger seats is arranged on at least one first receiving surface.

10. The passenger cabin according to claim 1, wherein, on the laterally outer sides of the lower passenger deck, there is arranged in each case at least one lower arrangement with passenger seats.

11. The passenger cabin according to claim 5,
wherein, on the laterally outer sides of the lower passenger deck, there is arranged in each case at least one lower arrangement with passenger seats, and
wherein the at least one lower arrangement with passenger seats is arranged on the at least one second receiving surface.

12. The passenger cabin according to claim 10, wherein a lower aisle is arranged in the center of the lower base.

13. The passenger cabin according to claim 1, wherein the floor overhangs each form a lateral aisle for the upper passenger deck.

14. An aircraft comprising an aircraft fuselage comprising a passenger cabin according to claim 1 arranged therein in at least one axial section.

15. The aircraft according to claim 14, wherein, in at least one additional axial section, an alternative passenger cabin, with a single passenger deck and a cargo hold arranged therebelow, is formed, wherein the single passenger deck has a floor arranged so as to be lower than the floor overhangs.

* * * * *